US012647290B2

(12) United States Patent
Ferenczi et al.

(10) Patent No.: US 12,647,290 B2
(45) Date of Patent: Jun. 2, 2026

(54) SYSTEMS AND METHODS FOR PROVIDING BACKWARD-COMPATIBLE HASHES FROM SEMI-STRUCTURED DATA

(71) Applicant: Optum, Inc., Minnetonka, MN (US)

(72) Inventors: Andras Ferenczi, Minnetonka, MN (US); Srilekha Akula, Minnetonka, MN (US); Avinash Burra, Minnetonka, MN (US)

(73) Assignee: Optum, Inc., Minnetonka, MN (US)

( * ) Notice: Subject to any disclaimer, the term of this patent is extended or adjusted under 35 U.S.C. 154(b) by 213 days.

(21) Appl. No.: 18/352,536

(22) Filed: Jul. 14, 2023

(65) Prior Publication Data

US 2025/0023747 A1     Jan. 16, 2025

(51) Int. Cl.
*H04L 9/00* (2022.01)
*G06F 16/27* (2019.01)

(52) U.S. Cl.
CPC ................ *H04L 9/50* (2022.05); *G06F 16/27* (2019.01)

(58) Field of Classification Search
CPC .................................. H04L 9/50; G06F 16/27
See application file for complete search history.

(56) References Cited

U.S. PATENT DOCUMENTS

| | | | | |
|---|---|---|---|---|
| 11,544,794 B2 * | 1/2023 | Wang | ..................... | G06Q 40/08 |
| 11,595,202 B1 * | 2/2023 | Stewart | ..................... | H04L 9/50 |
| 2013/0262976 A1 * | 10/2013 | Weber | ................... | G06Q 50/10 |
| | | | | 715/229 |
| 2020/0034833 A1 * | 1/2020 | Collen | ................... | G06Q 50/06 |
| 2021/0044637 A1 * | 2/2021 | Lee | ..................... | H04L 65/4025 |
| 2022/0366406 A1 * | 11/2022 | Perez | .................. | G06Q 20/389 |

* cited by examiner

*Primary Examiner* — Viet D Vu
(74) *Attorney, Agent, or Firm* — MARSHALL, GERSTEIN & BORUN LLP

(57)             ABSTRACT

Systems and methods for providing collision-free unique versioned identifiers using a distributed ledger are provided herein. An example system may include a unique identifier provider that is configured to provide evolving, backward compatible, unique versioned identifiers from semi-structured data such as forms or claims to various in a decentralized fashion.

20 Claims, 5 Drawing Sheets

300

| 310 |
| Receive claim and/or request for unique versioned identifier |

| 320 |
| Generate unique versioned identifier (e.g., perform hashing operation) |

| 330 |
| Evaluate unique versioned identifier using one or more machine learning algorithms (e.g., return a tuple for each of a plurality of identifiers) |

340

Are multiple identifiers linked?        YES

NO

| 350 |
| In response to determining that multiple identifiers are not linked, generate new entry |

| 360 |
| Store new entry/data structure |

| 370 |
| Provide unique versioned identifier and all available associated identifiers |

FIG. 3

SYSTEMS AND METHODS FOR PROVIDING BACKWARD-COMPATIBLE HASHES FROM SEMI-STRUCTURED DATA

BACKGROUND

Various entities (e.g., individuals, organizations) expose collaborative functionality via Application Processing Interfaces (APIs). Such operations may include claims processing, administrative checks, clinical validations, benefits calculations, member out-of-pocket determinations, and the like. In existing systems, identifiers are generated by applying an algorithm on an existing form. For example, a medical provider may generate an identifier for a semi-structured data object or form, such as a claim. It can be challenging to correlate such semi-structured data (e.g., an initial claim and a subsequent version of the same claim) and one or more entities (e.g., a medical provider and a payor) may generate and store multiple identifiers for the same claim by applying different algorithms. In some cases, multiple parties can generate the same identifier for a given claim by applying the same algorithm to the same claim. However, algorithms may be updated and/or modified after adoption, and a given claim may be updated over time such that disparate identifiers are generated for identical or related claims.

There is a need for systems that are configured to facilitate accurate data correlation that can be managed in a decentralized way. Embodiments of the present disclosure provide systems and methods for providing evolving, backward-compatible, unique versioned identifiers from semi-structured data such as forms or claims.

SUMMARY

In some embodiments, a computer-implemented method is provided herein. The computer-implemented method may comprise: receiving, by one or more processors, a claim from a first entity; generating, using a hashing operation and by the one or more processors, a unique versioned identifier for the claim; identifying, using a plurality of algorithms and by the one or more processors, a plurality of identifiers, wherein each of the plurality of identifiers comprises a previously generated unique versioned identifier; determining, by the one or more processors, whether the plurality of identifiers is linked to the unique versioned identifier; if the plurality of identifiers is linked to the unique versioned identifier, transmitting, by the one or more processors, the unique versioned identifier and the plurality of identifiers to the first entity; and if the plurality of identifiers is not linked to the unique versioned identifier, storing, by the one or more processors, the unique versioned identifier as a new entry or data structure.

In some embodiments, a system is provided. The system can comprise at least one computing device; and a computer-readable medium with computer-executable instructions stored thereon that when executed by the at least one computing device cause the system to: receive a claim from a first entity, generate, using a hashing operation, a unique versioned identifier for the claim; identify, using a plurality of algorithms, a plurality of identifiers, wherein each of the plurality of identifiers comprises a previously generated unique versioned identifier; determine whether the plurality of identifiers is linked to the unique versioned identifier; if the plurality of identifiers is linked to the unique versioned identifier, transmit the unique versioned identifier and the plurality of identifiers to the first entity; and if the plurality of identifiers is not linked to the unique versioned identifier, store the unique versioned identifier as a new entry or data structure.

In some embodiments, a non-transitory computer-readable medium with computer-executable instructions stored thereon that when executed by at least one computing device cause the at least one computing device to: receive a claim from a first entity, generate, using a hashing operation, a unique versioned identifier for the claim; identify, using a plurality of algorithms, a plurality of identifiers, wherein each of the plurality of identifiers comprises a previously generated unique versioned identifier; determine whether the plurality of identifiers is linked to the unique versioned identifier; if the plurality of identifiers is linked to the unique versioned identifier, transmit the unique versioned identifier and the plurality of identifiers to the first entity; and if the plurality of identifiers is not linked to the unique versioned identifier, store the unique versioned identifier as a new entry or data structure.

The systems and methods described herein provide at least the following advantages. In some implementations, a unique identifier (ID) provider is provided that can comprise a distributed cryptographic ledger or smart contract and is used to generate unique versioned identifiers. In some examples, the unique ID provider can provide access to the unique versioned identifiers to various entities and each entity is able to access up-to-date identifiers for semi-structured data (e.g., a claim or form) without having to individually generate, maintain, and store large amounts of data. Additionally, embodiments of the present disclosure facilitate accurate and fast data correlation in a seamless and accessible manner.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate systems and methods for generating, providing, and storing/maintaining collision-resistant unique identifiers for semi-structured data (e.g., a claim or form). Together with the description, the figures further serve to explain the principles of the systems and methods described herein and thereby enable a person skilled in the pertinent art to make and use the systems and methods described herein.

FIG. 3 is an illustration of a method performed by a unique identifier provider in accordance with various embodiments of the present disclosure;

DETAILED DESCRIPTION

Figure 1:
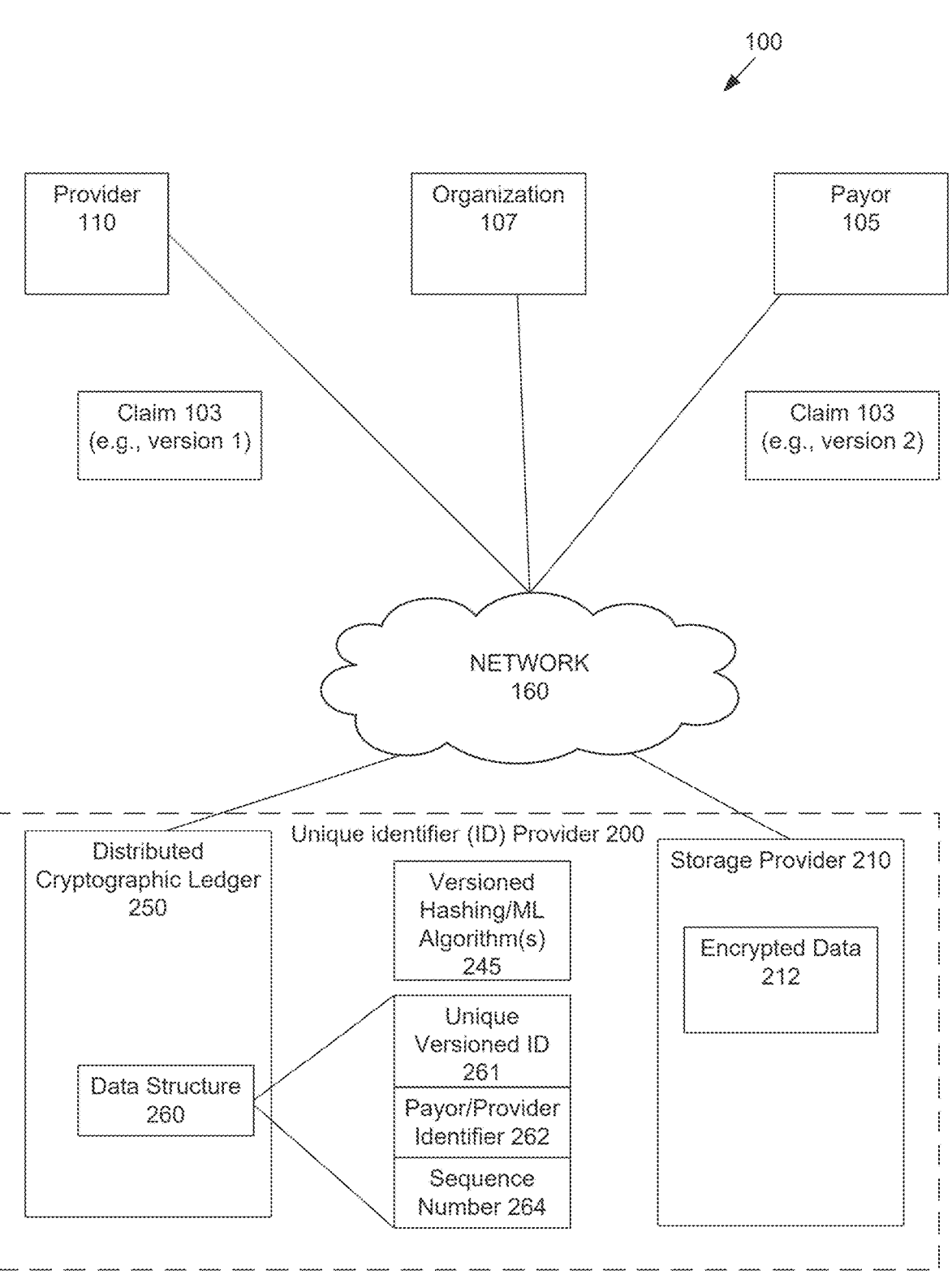
FIG. 1 is an example environment for providing a collision-resistant, unique versioned identifier in accordance with various embodiments of the present disclosure.

Embodiments of the present disclosure facilitate sharing of medical information between various entities (e.g., medical providers, insurance companies, and customers). A medical provider can generate a claim for services rendered to a patient and send the claim to a claim payor for processing on behalf of the patient. An example claim can comprise semi-structured data containing information describing a medical encounter or service. The medical provider may generate a static identifier (e.g., a string of alphanumeric characters) for the claim. Historically, static identifiers are maintained by one or more of the entities described above (e.g., medical providers), where the entity makes the static identifiers available to others via an application programming interface (API). Thus, different entities may generate and store different static identifiers for the same claim or related claims.

During claims processing, multiple versions of a given claim may be generated and/or exchanged between entities numerous times. For example, a claim payor may reject a claim that is missing certain information (e.g., justification for a procedure, procedural code, lab work, or the like) and ask another entity (e.g., medical provider) to resubmit the claim. In another example, a network failure can occur while a provider is processing a batch of claims which can result in multiple versions of the same claim being generated, stored, and/or transmitted to another entity. In such examples, multiple versions of a single claim corresponding with, for example, a medical event or service, may exist where each version of the claim is associated with a different static identifier which can make data correlation challenging while also increasing data storage and computing resource requirements.

Embodiments of the present disclosure provide a decentralized system that facilitates generating and maintaining dynamic, evolving, backward-compatible claim versioned identifiers that can be accessed by multiple parties without the need for a central server, for example, using a distributed cryptographic ledger or private shared ledger. The terms "unique versioned identifier," "unique versioned claim identifier," "dynamic and/or evolving identifier," "collision-resistant identifier," and "backward-compatible claim identifier," and/or the like are used interchangeably herein.

In accordance with embodiments described herein, a unique ID provider may comprise or utilize a smart contract which in turn can comprise a program running in a distributed environment or ledger. By way of example, a blockchain may comprise a plurality of nodes (e.g., millions of nodes) that each represent an organization, individual, or entity. In contrast with existing solutions where one entity maintains static identifiers for its own use and/or on behalf of others, embodiments of the present disclosure facilitate the provision of collision-resistant unique versioned identifiers via a distributed ledger such that no single entity or server needs to maintain extensive data storage facilities and can access (e.g., retrieve, request) up-to-date information in real-time. In various examples, a unique ID provider can provide dynamic, backward-compatible versioned identifiers for claims, forms, or other types of semi-structured data that are accessible to various entities (e.g., organizations) and that can evolve over time.

Embodiments of the present disclosure may be configured to be implemented using a variety of network architectures and/or communication channels. For example, private communication channels such as a Virtual Private Network (VPN), a blockchain-as-a-service solution (e.g., International Business Machines (IBM) blockchain which may be a cloud-based solution, physical communication channels, combinations thereof, and the like).

FIG. 1 is an example environment for providing collision-resistant unique versioned identifiers to various entities using a distributed ledger. As shown, the environment 100 may include one or more providers 110, one or more payors 105, one or more organizations 107, and one or more unique identifier (ID) providers 200 in communication through a network 160. The network 160 may include a combination of private networks (e.g., LANs) and public networks (e.g., the Internet). Each of the one or more providers 110, the one or more payors 105, the one or more organizations 107, and the one or more unique ID providers 200 may be partially implemented by one or more general purpose computing devices such as the computing device 500 illustrated in FIG. 5.

The provider 110 may be a medical provider or any other entity that provides claims 103 (e.g., a first version of a claim 103) to one or more claim payors 105. As depicted, the claim payor 105 can provide and/or receive other versions of the same claim (e.g., a second version of the claim 103). The claim 103 may be insurance claims, and in some embodiments, claim 103 related to medical services provided to a patient by the provider 110 or another entity. The payor 105 may include insurance companies, government entities, or any other entity that may process or evaluate claim 103 on behalf of patients or other entities. The organization 107 may be a healthcare and/or technology company that provides services to providers 110. The unique ID provider 200 may comprise a software algorithm that is generated and/or triggered by the organization 107 or another entity, such as a versioned hashing algorithm, other machine learning model/algorithm(s) 245, and/or the like, as discussed in more detail below.

To provide for efficient storage and to preserve the privacy of patients associated with the claim 103, the unique ID provider 200 may utilize or comprise a storage provider 210 and/or a distributed cryptographic ledger 250. The storage provider 210 as used herein includes any entity that provides on demand, cloud-based computing infrastructure or services including database management, machine learning services, networking, content delivery, storage, and the like. Example storage providers include Amazon Web Services (AWS), Azure Web Apps, and Google Cloud Platform. Each storage provider 210 may expose an API through which the providers 110, organizations 107, and payors 105 may write and read documents (e.g., claim 103) from the storage providers 210. In some implementations, an entity can drop/add files or data blobs into cloud storage for a consuming application that can be accessed by the unique ID provider 200.

The distributed cryptographic ledger 250 may be or comprise a record keeping system where transactions (or any data structure 260) can be recorded in blocks on the ledger 250. Examples of suitable ledgers 250 include blockchain. The data structure 260 may be a non-fungible token ("NFT"), although other types of data structures 260 may be used. The data structure 260 may include a plurality of fields including, but not limited to, a unique versioned identifier 261 generated by the unique ID provider 200, a payor/provider identifier 262, and a sequence number 264. Other fields may be supported. In some embodiments, the unique claim identifier 261 may uniquely identify the claim 103. In some embodiments, the payor/provider identifier 262 may be the public key of a payor or provider that is associated with the claim 103. The sequence number 264 may be used to identify actions or responses with respect to the data structure 260. Each subsequent action taken with respect to the claim 103 may increment the sequence number 264 by one and/or trigger updating and/or modifying the unique versioned identifier 261.

The provider 110 may provide a claim 103 for processing by one of a plurality of available payors 105. The claim 103 may be associated with a medical service and may be formatted using the X12 transaction format. The claim 103 may be associated with one or more unique versioned identifiers 261 generated by the unique ID provider 200 in response to one or more requests. The storage provider 210 may store the claim 103 in encrypted data storage 212.

As described in detail herein, providers 110, organizations 107, and payors 105 may obtain unique versioned identifiers 261 from a unique ID provider 200 that comprises a smart contract stored on a distributed cryptographic ledger 250. The smart contract may be a computer program or transaction protocol that is configured to automatically execute and/or faciliate one or more actions or events according to the terms of a contract, agreement, and/or agreed parameters. An example smart contract may be associated with one or more cryptocurrencies and may be run on a designated framework or platform, such as a public or private blockchain. Exemplary blockchains include, but are not limited to, Ethereum, Bitcoin, Binance Smart Chain, Solana, and Cardano.

Figure 2:
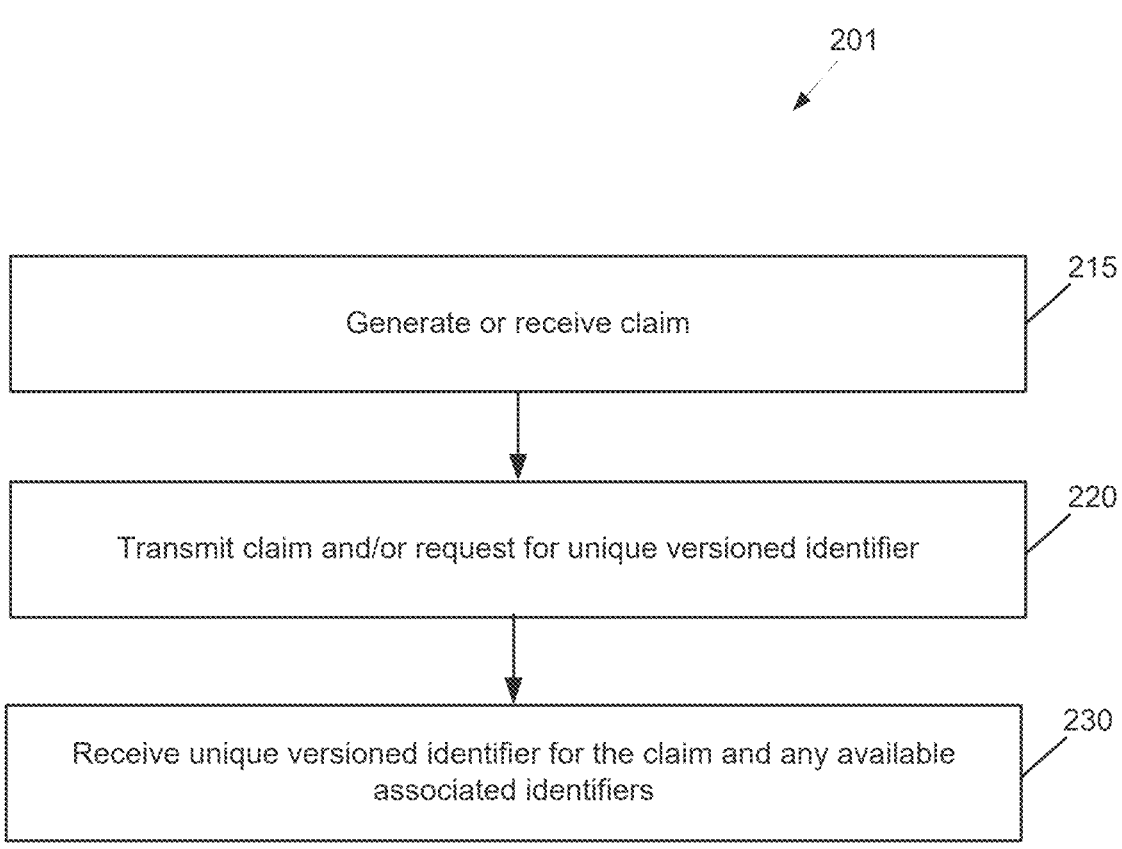
FIG. 2 is an illustration of a method performed by a first entity (e.g., provider or payor) in accordance with various embodiments of the present disclosure.

Referring now to FIG. 2 and FIG. 3, exemplary operations for providing a collision-resistant unique identifier that can be accessed and utilized by various entities (e.g., a provider, a payor, and/or the like) are depicted. In some embodiments, the operations depicted in FIG. 2 and FIG. 3 may be performed by various entities in different fields and contexts such as, but not limited to, healthcare, business services, customer service, insurance, banking, and the like. In some embodiments, each entity may be a node on a blockchain (e.g., private blockchain, public blockchain, or the like).

FIG. 2 is an illustration of a method 201 performed by a first entity (e.g., healthcare/technology company, service provider, or the like). FIG. 3 is an illustration of a method 300 performed by a unique ID provider (e.g., smart contract).

Referring now to FIG. 2, at step/operation 215, the first entity (e.g., organization 107, provider 110, payor 105, described above in connection with FIG. 1) generates or receives a claim. For example, a healthcare/technology company may receive a claim from a medical provider, or a medical provider may generate a claim for submission to a payor.

Subsequent to step/operation 215, the method 201 proceeds to step/operation 220. At step/operation 220, the first entity transmits the claim and/or a request for a unique versioned identifier to the unique ID provider (e.g., unique ID provider 200 described above in connection with FIG. 1), for example, via an API call. In some embodiments, the request includes the claim. In other embodiments, the request may include instructions for the unique ID provider to retrieve the claim from another source (e.g., database, another entity, or the like). In some examples, the claim may be in Extensible Markup Language (XML) format, American National Standards Institute (ANSI) X12 format, such as Electronic Data Interchange (EDI) 837 format, 835 format, or the like. An 837 file is an electronic file comprising patient information that is submitted by a health provider to a payor (e.g., insurance company). An 835 is an Electronic Remittance Advice (ERA) that comprises claim payment information and electronic funds transfer (EFT) and can describe how a claim is paid or denied electronically. In various embodiments, the claim can be any other type of semi-structured form, data entry, or data object.

Turning now to FIG. 3, the method 300 begins at step/operation 310. At step/operation 310, the unique ID provider (e.g., smart contract) receives a claim and/or a corresponding request (e.g., call, invocation of a smart contract, or the like) for a unique versioned identifier from the first entity. In some embodiments, the unique ID provider/smart contract may further validate the identity of the sender of the request. For example, the smart contract may determine whether the sender of the initial invocation or request is one of a plurality of enrolled entities that are associated with the smart contract.

Subsequent to step/operation 310, the method 300 proceeds to step/operation 320. At step/operation 320, the unique ID provider generates a unique versioned identifier for the claim, for example, by performing a hashing operation on the claim. In some embodiments, the unique ID provider performs a hashing operation in response to determining that claim parameters (e.g., for a first version of a claim and a second version of a claim provided by the same entity or different entities) have changed. For example, the unique ID provider may compare an incoming tuple to an existing data set in its datastore. If the incoming tuple does not exist, then the unique ID provider creates a new unique versioned identifier with the new claim parameters.

In some examples, the unique ID provider utilizes an algorithm that performs hashing of elements by flattening the document (e.g., X12 document), stripping the document of whitespaces, converting all text to lower case (e.g., convert "Mr. John McElroy" to "johnmcelroy"), removing diacritics (e.g., convert "ç" to "c"), and/or ordering keys alphabetically.

Subsequent to step/operation 320, the method 300 proceeds to step/operation 330. At step/operation 330, the unique ID provider evaluates the generated unique versioned identifier (e.g., hash) and may, in some examples, receive/retrieve feedback data from other entities (e.g., a provider). In some implementations, the unique ID provider applies artificial intelligence, for example, one or more machine learning algorithms to continuously evaluate the outputs being generated using the hashing operation. For example, the unique ID provider can evaluate a generated unique versioned identifier (e.g., hash), and feedback data provided by various entities (e.g., provider, payor) relating to a semi-structured input or output (e.g., claim). In some implementations, participating entities (e.g., payer(s), provider(s), unique ID provider) can provide feedback that can be used to alter weights in a machine learning model as one parameter becomes more prominent than others (e.g., a middle name is less important than a last name) based on system performance over time. In some implementations, a provider or payor can apply a label or tag to a stored hash indicating whether or not one or more hash parameters are useful. The machine learning algorithm can continuously evaluate and/or weigh claim parameters in order to subsequently generate better hashes. For example, the machine learning algorithm can be used to determine which parameters can be excluded in order to make a hash more collision resistant. In other words, the unique ID provider can use one or more machine learning algorithms to improve its hashing operation by, for example, identifying and excluding particular fields that were included in suboptimal hashes as identified by a provider or other entity. An example machine learning model/algorithm may be a language-based model, neural network, transformer-based model, or the like. The machine learning model/algorithm can be continuously trained after being deployed based on new feedback data provided by various entities.

The term "artificial intelligence" is defined herein to include the capability of a functional unit to perform functions that are generally associated with human intelligence such as reasoning and learning. AI includes, but is not limited to, knowledge bases, machine-learning, representation learning, and deep learning. The term "machine-learning" is defined herein to be a subset of AI that enables a machine to acquire knowledge by extracting patterns from raw data. Machine-learning techniques include, but are not limited to, logistic regression, support vector machines (SVMs), decision trees (including randomized decision forests), Naïve Bayes classifiers, and artificial neural networks. The term "representation learning" is defined herein to be a subset of machine-learning that enables a machine to automatically discover representations needed for feature detection, prediction, or classification from raw data. Representation learning techniques include, but are not limited to, autoencoders. The term "deep learning" is defined herein to be a subset of machine-learning that that enables a machine to automatically discover representations needed for feature detection, prediction, classification, etc. using layers of processing. Deep learning techniques include, but are not limited to, artificial neural networks (including deep nets, long short-term memory (LSTM) recurrent neural network (RNN) architecture), or multilayer perceptron (MLP). Machine-learning models include supervised, semi-supervised, and unsupervised learning models. In a supervised learning model, the model learns a function that maps an input (also known as feature or features) to an output (also known as a target or target) during training with a labeled data set (or dataset). In an unsupervised learning model, the model learns a function that maps an input (also known as feature or features) to an output during training with an unlabeled data set. In a semi-supervised model, the model learns a function that maps an input (also known as feature or features) to an output (also known as a target or target) during training with both labeled and unlabeled data. In some instances, the AI may comprise natural language processing (NLP). NLP refers to a branch of AI concerned with giving computers the ability to understand text and spoken words in much the same way human beings can.

The unique ID provider can evaluate a claim using one or more machine learning models and determine that certain parameters should be assigned a higher weight relative to others. For example, a social security number associated with a first name and last name, which are immutable values, should be assigned a higher weight than a procedure code, since procedure codes may differ amongst entities/providers. The unique ID provider may provide information regarding which weights are assigned to all participating entities in order to foster transparency between all participants.

In some embodiments, the unique ID provider performs semantic parsing and large-scale classification of names using word embeddings (e.g., names to nicknames, correcting various misspellings of words or names, and the like) and can output a hash or string of bits (e.g., 256 bits). The unique ID provider can adopt and/or implement a versioned hashing algorithm or other types of machine learning models/cryptographic algorithms that are available via various entities, including public repositories, decentralized storage, distributed ledgers, or a centralized system/database. In some implementations, the unique ID provider can utilize a quantum cryptography solution. A versioned hashing algorithm is generally used in file verification, digital signatures, and data authentication applications and is a cryptographic hashing function that incorporates a version number into the input of the hash function. This allows for the generation of different hash values for the same input data, based on the version number used. Using a versioned hashing algorithm facilitates changes to the hash function over time while still maintaining the ability to validate the integrity of data that was hashed with previous versions of the function. For example, if a file is hashed using version one of a versioned hashing algorithm, and later a security vulnerability is discovered in that algorithm, a new version (e.g., version two) can be released that addresses the vulnerability. When the file is subsequently hashed using version two of the algorithm, a different hash value will be produced than the one generated with version 1. However, by including the version number in the hash calculation, it is possible to determine which version of the algorithm was used to hash the data, and thus validate the integrity of the data against the correct hash value.

A list of historical unique versioned identifiers associated with a given claim are maintained by the unique ID provider, along with a set of APIs to make the identifiers accessible. Internal datastores of participants are indexed by multiple identifiers if/when available. In other words, the system can maintain a list of "aliases" derived from an original document (e.g., claim) at different points in time and a commonly adopted algorithm provides different hashes (hence versioning). In some implementations, a plurality of unique ID providers can utilize a machine learning model and/or algorithm that is identical for each generation of unique versioned identifiers. In some implementations, model weights are shared via a distributed ledger. In some embodiments, a plurality of unique ID providers can utilize a shared algorithm (e.g., smart contract). In some examples, all of the plurality of unique ID providers can access/use the same machine learning model or algorithm at any given point in time which can involve utilizing a new version of a smart contract. For example, participating entities can collaborate on how parametric weights are associated in order to improve model performance. In some embodiments, at step/operation 330, the unique ID provider applies a plurality algorithms (e.g., all existing generations of an algorithm such as a versioned hashing algorithm) to the claim and returns multiple unique versioned identifiers, such as a tuple of each (e.g., ID1, ID2, ID3, and so on). A tuple is an immutable data structure that contains a sequence of elements, which can each be of a different data type. Tuples can be used to group related data together in a single object and can describe information in a two-dimensional space.

Subsequent to step/operation 330, the method 300 proceeds to step/operation 340. At step/operation 340, the unique ID provider determines whether the multiple unique versioned identifiers are linked or associated with one another. For example, the unique ID provider assesses or checks a ledger (e.g., distributed cryptographic ledger 250 described above in connection with FIG. 1) or mapping, such as a Directed Acyclic Graph (DAG), to determine whether the multiple unique versioned identifiers are linked together. A DAG is a graph containing nodes connected by directed edges where the edges have a specific direction and there are no cycles in the graph. Each node of the DAG can represent a different entity, and each directed edge can represent a relationship or dependencies between the entities. The DAG can be used to map dependencies between different identifiers where each node represents a version/identifier for a given claim. Other mapping mechanisms and data structures can be used to correlate unique versioned identifiers with one another. If the multiple unique versioned identifiers are linked/associated with one another, the method 300 proceeds to step/operation 370 and the unique ID provider returns the generated unique versioned identifier and all associated unique versioned identifiers.

If the unique ID provider determines that the multiple identifiers are not linked (e.g., are not recorded in a DAG or ledger), the method 300 proceeds to step/operation 350 and the unique ID provider generates a new entry. In other words, the unique ID provider generates an entry (e.g., data structure 260 described with reference to FIG. 1) for the unique versioned identifier if it doesn't already exist in storage/the ledger. As noted above, in the example of a claim 103, the data structure 260 may comprise a unique claim identifier 261, a payor/provider identifier 262, and a sequence number 264.

Subsequent to step/operation 350, the method 300 proceeds to step/operation 360. At step/operation 360, the unique ID provider stores the unique versioned identifier as a new entry, for example, in a DAG or other storage format.

Subsequent to step/operation 360, the method 300 proceeds to step/operation 370. At step/operation 370, the unique ID provider provides (e.g., transmits, sends) the unique claim identifier and, in some examples, the other associated identifiers to the first entity.

Returning to FIG. 2, at step/operation 230, the first entity (e.g., healthcare/technology company, service provider, or the like) receives the unique versioned identifier and any available associated identifiers from the unique ID provider (e.g., smart contract).

Thus, a healthcare/technology organization or other entity can index its datastores based on all known identifiers and can reach out to the unique ID provider with an existing identifier, for which the unique ID provider will return all other associated identifiers if they are associated with one another on a shared graph or ledger. Since the algorithm evolves to better associating claims, a benefit to the health/technology organization is that it will be able to correlate better distinct claims in its datastores, which are in fact the same or related to one another.

Figure 4:
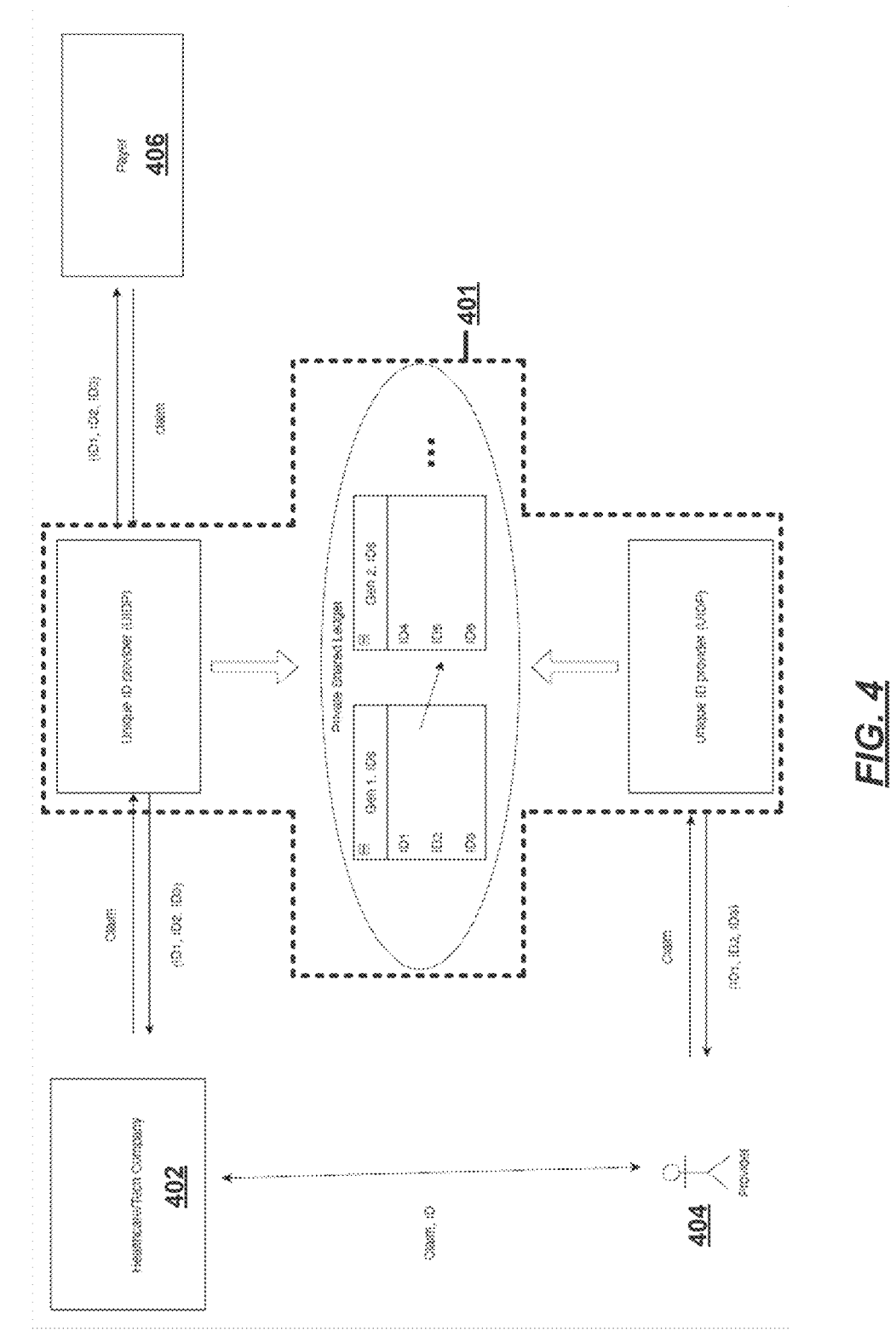
FIG. 4 is another example environment for providing collision-resistant unique versioned identifiers in accordance with various embodiments of the present disclosure.

Referring now to FIG. 4, another example environment 400 for providing a collision-resistant unique identifier that can be accessed and utilized by various entities u in accordance with various embodiments of the present disclosure is provided. As depicted, a unique ID provider 401 comprises a private shared ledger (e.g., distributed cryptographic ledger or smart contract) and is configured to provide collision-resistant unique identifiers to various entities including a healthcare/technology company 402, a provider 404, and a payer 406. Exemplary operations are discussed in more detail above with reference to FIG. 2 and FIG. 3.

As depicted in FIG. 4, a healthcare/technology company 402, provider 404, or payor 406 invokes or transmits a request to generate or retrieve a unique identifier to a unique ID provider 401. As discussed above, the unique ID provider 401 can comprise a private shared ledger, distributed cryptographic ledger, smart contract, and/or the like. In some embodiments, the unique ID provider 401 can comprise multiple entities. The request can be or comprise a claim. In some embodiments, the requesting entity may also provide additional information with the request (e.g., relating to a particular claim such as payer information, provider information, and the like).

In response to receiving the request and/or claim, the unique ID provider 401 generates a unique versioned identifier for the claim. Subsequently, the unique ID provider 401 applies a plurality algorithms and returns multiple identifiers, such as a tuple of each. The unique ID provider 401 determines which identifiers are linked to a given claim. In the example shown in FIG. 4, the unique ID provider 401 returns a first generation of identifiers (ID1, ID2, and ID3) and a second generation of identifiers (ID4, ID5, ID6) associated with the claim. For example, the unique ID provider 401 checks a ledger (e.g., private shared ledger, distributed cryptographic ledger) and/or graph to determine which identifiers are linked and/or otherwise associated with one another.

If the claim is not associated with any stored identifiers, the unique ID provider 401 stores the new unique identifier for the claim as a new entry/in a data structure (e.g., in the ledger and/or graph). In response to determining that the claim is associated with existing/stored identifiers, the unique ID provider returns the generated unique identifier and all stored unique identifiers associated therewith to the requesting entity (e.g., healthcare/technology company 402, provider 404, or payer 406).

Accordingly, the healthcare/technology company 402, provider 404, and payer 406 can reach out to the unique ID provider with an existing identifier and/or new claim and receive all other associated identifiers for that claim. Since the algorithm evolves by associating claims over time, a benefit to various entities is the ability to accurately identify related claims in their datastores, which are in fact the same (e.g., associated with a single medical event or service).

Figure 5:
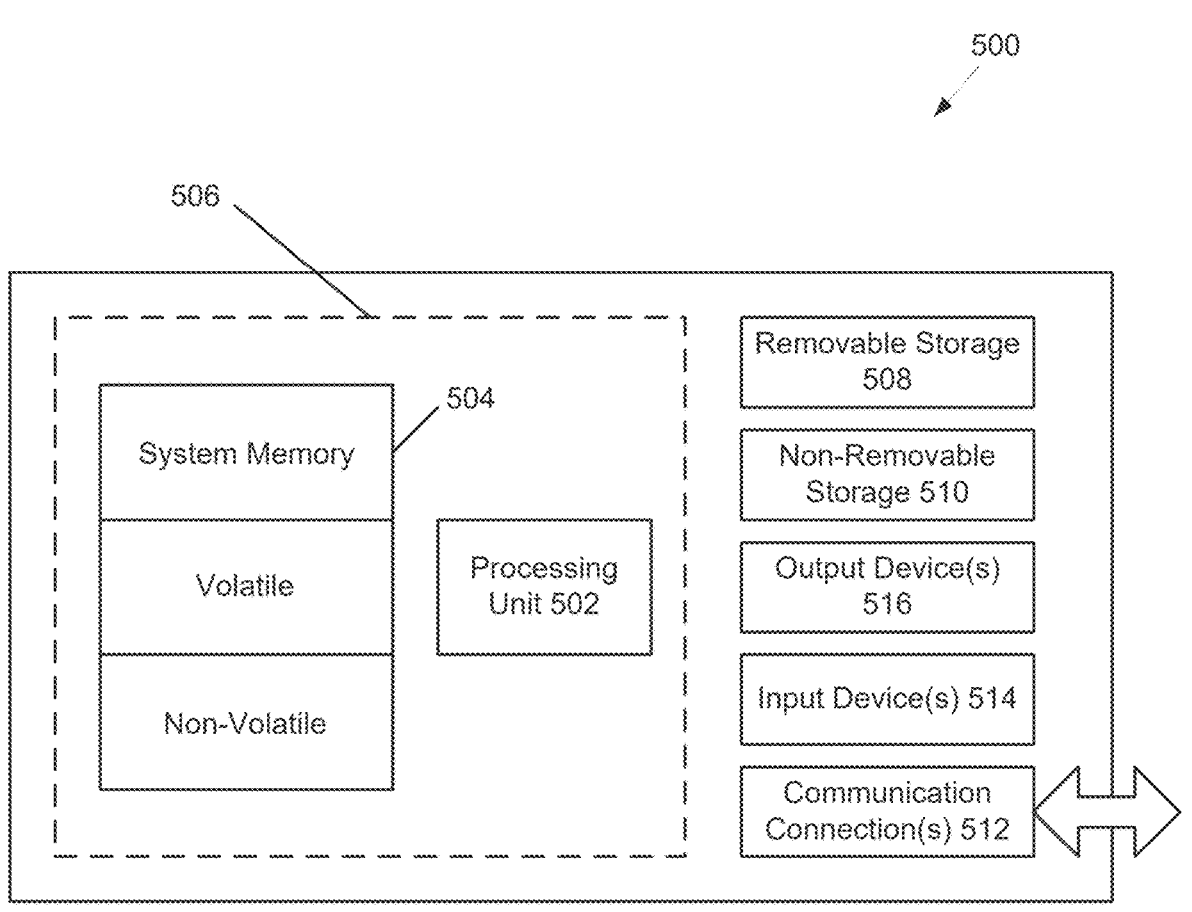
FIG. 5 shows an example computing environment in which example embodiments and aspects may be implemented.

FIG. 5 shows an example computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an example system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random-access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although example implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:

receiving, by one or more processors, a claim from a first entity;

generating, using a hashing operation and by the one or more processors, a unique versioned identifier for the claim;

identifying, using a plurality of algorithms and by the one or more processors, a plurality of identifiers, wherein each of the plurality of identifiers comprises a previously generated unique versioned identifier, and wherein the plurality of algorithms includes two or more different algorithms that, when applied to claim data, are configured to generate identifiers;

assessing, by the one or more processors, a mapping describing relationships or dependencies between the plurality of identifiers; and based on determining that the plurality of identifiers is linked to the unique versioned identifier, transmitting, by the one or more processors, the unique versioned identifier and the plurality of identifiers to the first entity; or based on determining that the plurality of identifiers and the unique versioned identifier are unlinked, storing, by the one or more processors, the unique versioned identifier as a new entry or data structure.

2. The computer-implemented method of claim 1, wherein generating the unique versioned identifier comprises applying, by the one or more processors, a versioned hashing algorithm.

3. The computer-implemented method of claim 1, wherein the computer-implemented method is implemented via at least one of a smart contract, distributed cryptographic ledger, or private shared ledger.

4. The computer-implemented method of claim 1, further comprising:

applying, by the one or more processors, one or more machine learning models to perform an evaluation of the unique versioned identifier and the plurality of identifiers generated using the hashing operation.

5. The computer-implemented method of claim 4, wherein the one or more machine learning models comprise at least one of a language-based model, neural network, or transformer-based model.

6. The computer-implemented method of claim 4, further comprising:

modifying, by the one or more processors, model weights associated with a plurality of claim parameters based on the evaluation of the unique versioned identifier and the plurality of identifiers.

7. A system comprising:

one or more processors; and one or more memories storing processor-executable instructions that, when executed by the one or more processors, cause the one or more processors to perform operations comprising:

receiving a claim from a first entity, generate, using a hashing operation, a unique versioned identifier for the claim;

identifying, using a plurality of algorithms, a plurality of identifiers, wherein each of the plurality of identifiers comprises a previously generated unique versioned identifier, and wherein the plurality of algorithms includes two or more different algorithms that, when applied to claim data, are configured to generate identifiers;

assessing a mapping describing relationships or dependencies between the plurality of identifiers; and based on determining that the plurality of identifiers is linked to the unique versioned identifier, transmitting the unique versioned identifier and the plurality of identifiers to the first entity; or based on determining that the plurality of identifiers and the unique versioned identifier are unlinked, storing the unique versioned identifier as a new entry or data structure.

8. The system of claim 7, wherein generating the unique versioned identifier comprises applying a versioned hashing algorithm.

9. The system of claim 7, wherein the unique versioned identifier and the plurality of identifiers are stored in a distributed cryptographic ledger or private shared ledger.

10. The system of claim 7, wherein the operations further comprise:

applying one or more machine learning models to evaluate the unique versioned identifier and the plurality of identifiers generated using the hashing operation.

11. The system of claim 10, wherein the one or more machine learning models comprise at least one of a language-based model, neural network, or transformer-based model.

12. The system of claim 10, wherein the operations further comprise:

applying one or more machine learning models to perform an evaluation of the unique versioned identifier and the plurality of identifiers generated using the hashing operation.

13. The system of claim 12, wherein the one or more machine learning models comprise at least one of a language-based model, neural network, or transformer-based model.

14. The system of claim 12, wherein the operations further comprise:

modifying model weights associated with a plurality of claim parameters based on the evaluation of the unique versioned identifier and the plurality of identifiers.

15. One or more non-transitory, computer-readable media storing processor-executable instructions that, when executed by one or more processors, cause the one or more processors to perform operations comprising:

receiving a claim from a first entity, generate, using a hashing operation, a unique versioned identifier for the claim;

identifying, using a plurality of algorithms, a plurality of identifiers, wherein each of the plurality of identifiers comprises a previously generated unique versioned identifier, and wherein the plurality of algorithms includes two or more different algorithms that, when applied to claim data, are configured to generate identifiers;

assessing a mapping describing relationships or dependencies between the plurality of identifiers;

based on determining that the plurality of identifiers is linked to the unique versioned identifier, transmitting the unique versioned identifier and the plurality of identifiers to the first entity; and based on determining that the plurality of identifiers and the unique versioned identifier are unlinked, storing the unique versioned identifier as a new entry or data structure.

16. The computer-implemented method of claim 1, wherein the two or more different algorithms include two or more algorithms corresponding to different versions.

17. The computer-implemented method of claim 16, wherein the two or more algorithms corresponding to different versions include two or more versioned hashing algorithms.

18. The system of claim 7, wherein the two or more different algorithms include two or more algorithms corresponding to different versions.

19. The system of claim 18, wherein the two or more algorithms corresponding to different versions include two or more versioned hashing algorithms.

20. The one or more non-transitory, computer-readable media of claim 15, wherein the two or more different algorithms include two or more algorithms corresponding to different versions.

* * * * *